(12) United States Patent
Haruyama

(10) Patent No.: US 7,929,051 B2
(45) Date of Patent: Apr. 19, 2011

(54) CAMERA INCORPORATING METHOD AND MOBILE ELECTRONIC EQUIPMENT WITH CAMERA

(75) Inventor: Syunji Haruyama, Tokyo (JP)

(73) Assignee: Fujitsu Toshiba Mobile Communications Limited, Kawaski (JP)

( * ) Notice: Subject to any disclaimer, the term of this patent is extended or adjusted under 35 U.S.C. 154(b) by 478 days.

(21) Appl. No.: 11/889,526

(22) Filed: Aug. 14, 2007

(65) Prior Publication Data
US 2008/0252777 A1    Oct. 16, 2008

Related U.S. Application Data

(62) Division of application No. 10/715,465, filed on Nov. 19, 2003, now Pat. No. 7,317,476.

(30) Foreign Application Priority Data

Nov. 19, 2002   (JP) .................................. 2002-334562

(51) Int. Cl.
*H04N 5/225* (2006.01)
(52) U.S. Cl. ......................... 348/373; 348/374; 348/376
(58) Field of Classification Search .................. 348/376, 348/374, 340, 373
See application file for complete search history.

(56) References Cited

U.S. PATENT DOCUMENTS

| | | | |
|---|---|---|---|
| 5,517,683 A | 5/1996 | Collett et al. | |
| 5,966,176 A * | 10/1999 | Chow et al. | 348/373 |
| 6,683,644 B1 * | 1/2004 | Nakao et al. | 348/273 |
| 6,715,939 B2 * | 4/2004 | Ford | 396/427 |
| 6,760,074 B1 | 7/2004 | Maruyama et al. | |
| 6,795,120 B2 | 9/2004 | Takagi et al. | |
| 6,842,585 B2 * | 1/2005 | Matsuo et al. | 396/89 |
| 6,900,843 B1 | 5/2005 | Uchiyama | |
| 7,046,296 B2 * | 5/2006 | Shinomiya | 348/374 |
| 7,102,676 B1 * | 9/2006 | Mochizuki | 348/307 |
| 7,110,033 B2 | 9/2006 | Miyake | |
| 7,161,630 B2 | 1/2007 | Akimoto et al. | |
| 7,180,546 B2 | 2/2007 | Kobayashi | |
| 7,190,404 B2 * | 3/2007 | Shinomiya | 348/374 |
| 7,227,577 B2 * | 6/2007 | Tanida et al. | 348/340 |
| 2004/0027458 A1 | 2/2004 | Takada | |

FOREIGN PATENT DOCUMENTS

| | | |
|---|---|---|
| JP | 6-23375 | 3/1994 |
| JP | 2002-247425 | 8/2002 |
| JP | 2002-290792 | 10/2002 |
| JP | 2002-300440 | 10/2002 |
| JP | 2002-314857 | 10/2002 |

OTHER PUBLICATIONS

Japanese Patent Office Action, issued by Japanese Patent Office Action in counterpart Japanese Application No. 2002-334562.

* cited by examiner

*Primary Examiner* — Lin Ye
*Assistant Examiner* — Amy Hsu
(74) *Attorney, Agent, or Firm* — Maschoff Gilmore & Israelsen

(57) ABSTRACT

In a mobile electronic equipment, a main body has a flat bottom surface and a flat side which cooperatively form a frame and having a recess with rib slots on its side. A camera unit is constructed by connecting a flexible cable to a substrate on which a camera IC portion is mounted. A holder has a window portion through which the camera IC portion is passed and a cover portion which covers the camera unit and which has ribs engaging with the respective rib slots. The camera unit is housed in the recess together with the holder in which the camera IC portion is passed through the window portion, and the ribs are fitted into the respective rib slots to incorporate the camera unit into the main body.

9 Claims, 3 Drawing Sheets

CAMERA INCORPORATING METHOD AND MOBILE ELECTRONIC EQUIPMENT WITH CAMERA

CROSS-REFERENCE TO RELATED APPLICATIONS

This application is a divisional of application Ser. No. 10/715,465, filed Nov. 19, 2003 now U.S. Pat. No. 7,317,476, which is incorporated in its entirety herein by reference. This application is also based upon and claims the benefit of priority from prior Japanese Patent Application No. 2002-334562, filed Nov. 19, 2002, the entire contents of which are incorporated herein by reference.

BACKGROUND OF THE INVENTION

1. Field of the Invention

The present invention relates to a method of incorporating a camera into a terminal and mobile electronic equipment with a camera, and in particular, to a method of incorporating a camera into a terminal which can be made smaller and which appropriately resists shocks as well as mobile electronic equipment with a camera.

2. Description of the Related Art

Mobile electronic equipment such as a mobile phone terminal with a camera is in common use. In such mobile electronic equipment, a camera IC is mounted on a ceramic substrate together with other chip parts, the camera IC having a photoelectric conversion element such as a CCD and a lens integrated with the element. The camera IC and a main substrate in the apparatus main body are connected together through a flexible cable, thus constituting a camera unit. However, with a camera unit having such a configuration, it is difficult to meet all requirements for shock resistance and the accurate adjustment of the optical axis of the lens. Accordingly, this camera unit has various technical problems to be solved.

More specifically, conventional camera units are configured, for example, as shown in FIG. 1. In FIG. 1, a camera IC 41 is mounted on a ceramic substrate 42 and installed on a main substrate 43 in the apparatus main body. In the structure shown in FIG. 4, installation plates in each of which an insertion guide for the ceramic substrate 42 is formed are fixed to the main substrate 43. A shock-absorbing rubber member 45 fixed to the main substrate 43 is arranged between each installation plate 44 and the main substrate 43. The camera IC 41 has been pushed into a recess in the shock-absorbing rubber member 45 so that the ceramic substrate 42 is locked in the insertion guides in the installation plates 44 to turn a photographing lens toward the outside of the apparatus. The ceramic substrate 42 is covered with a sponge 46 that is a shock absorbing member. Thus, the ceramic substrate 42, which is not resistant to mechanical shocks, is protected from external shocks. Furthermore, to allow the ceramic substrate 42 to be freely arranged relative to the installation plates 44, the ceramic substrate 42 is wrapped in the rubber and sponge shock-absorbing members 45 and 46. In such a structure, the rubber and sponge shock-absorbing members 45 and 46 absorb external shocks to protect the camera IC 41 and the ceramic substrate 42.

The camera IC 41, the ceramic substrate 42, and the main substrate 43 are covered with an enclosure 47 of the apparatus main body. The lens of the camera IC is arranged opposite a lens cover 48 set in the enclosure 47. A connector 49 is provided on the main substrate 43 so that the main substrate 43 and the ceramic substrate 42 are connected together by a flexible cable 50 via the connector 49. In a normal structure, the relative positional relationship between the main substrate 43 and the enclosure 47 is fixed.

In the layout shown in FIG. 4, a force F0 (shown by the hollow arrow in the figure) caused by the flexibility of the flexible cable 50 acts to push the ceramic substrate 42 and the camera IC, mounted on the ceramic substrate 42, rightward in this figure. The camera IC 41 is mechanically supported by the rubber shock-absorbing member 45 and the sponge shock-absorbing member 46. Accordingly, the above force may shift the ceramic substrate 42 and the camera IC 41 rightward to prevent the optical axis of the camera (shown by the alternate long and short dash line in the figure) from aligning with the central axis of the lens cover 48. In the worst case, this shifting may hinder an image pickup function.

The configuration shown in FIG. 4 is only an example, and a mounting method using shock absorbing members for ceramic substrates is not necessarily applied to such a structure. However, normally, if a camera must be incorporated into certain equipment, it is difficult to achieve this operation accurately as described above (misalignment of the optical axis), regardless of the structure of the camera. Furthermore, a space is required to install shock absorbing members, thus limiting a size reduction. Moreover, it is disadvantageously impossible to reduce the number of required parts.

To solve this problem, Jpn. Pat. Appln. KOKAI Publication No. 2002-314857 discloses a proposal for improving the accuracy for camera incorporation without increasing the number of required parts. In the structure disclosed in pages 2 to 4 and FIG. 1 of Jpn. Pat. Appln. KOKAI Publication No. 2002-314857, a camera IC is held by a holding member formed integrally with a case of a mobile phone. With this structure, the accuracy for camera incorporation can be improved with a reduced number of parts compared to the provision of a separate holding member.

When an incorporated camera is built into equipment, it is desirable not only to reduce the number of required parts but also to minimize the complicity of the shape and structure of the equipment main body into which the camera is incorporated. However, the structure disclosed in Jpn. Pat. Appln. KOKAI Publication No. 2002-314857 does not require any separate holding members but forms the holding member integrally with the case. Thus, disadvantageously, the shape and structure of the shape are complicated. Furthermore, shock absorbing members are still required to obtain shock resistance. Therefore, a reduction in the number of required parts is also limited.

BRIEF SUMMARY OF THE INVENTION

It is an object of the present invention to provide a camera incorporating method and mobile electronic equipment with a camera which need not complicate the shape or structure of an equipment main body and which do not require any shock absorbing members.

According to an aspect of the present invention, there is provide a camera incorporating method comprising:
providing a main body having a flat bottom surface and a flat side which cooperatively form a frame and having a recess with rib slots on its side;
providing a camera unit constructed by connecting a flexible cable to a substrate on which a camera IC portion is mounted;
providing a holder having a window portion through which the camera IC portion is passed and a cover portion which covers the camera unit and which has ribs engaging with the respective rib slots; and housing the camera unit in the recess together with the holder in which the camera IC portion is passed through the window portion, and fitting the ribs into the respective rib slots to incorporate the camera unit into the main body.

According to an another aspect of the present invention, there is provide a mobile electronic equipment comprising a main body having a flat bottom surface and a flat side which cooperatively form a frame and having a recess with rib slots on its side;

a camera unit constructed by connecting a flexible cable to a substrate on which a camera IC portion is mounted; and a holder having a window portion through which the camera IC portion is passed and a cover portion which covers the camera unit and which has ribs engaging with the respective rib slots, the camera unit being housed in the recess together with the holder in which the camera IC portion is passed through the window portion, and the ribs being fitted into the respective rib slots to incorporate the camera unit into the main body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

With reference to the drawings, description will be given below of a method of incorporating a camera into equipment and mobile electronic equipment with a camera according to an embodiment of the present invention.

Figure 2:
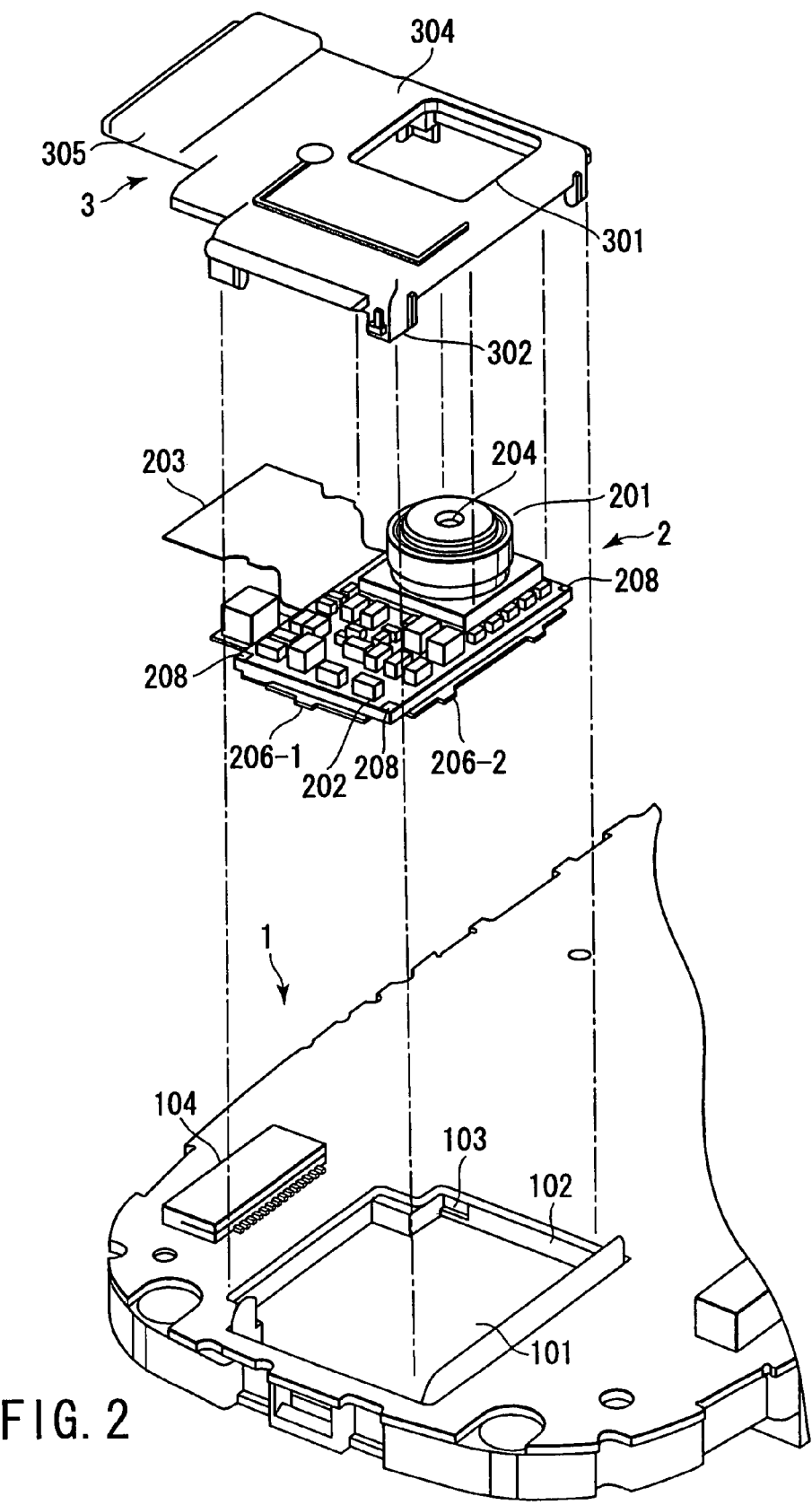
FIG. 2 is an exploded perspective view schematically showing a mobile terminal with a camera manufactured in accordance with a camera incorporating method according to an embodiment of the present invention.

FIG. 2 is a schematic exploded perspective view showing partly exploded equipment in order to describe the camera incorporating method according to this embodiment of the present invention.

In FIG. 2, reference numeral 1 denotes a base portion of the main body of equipment into which a camera is incorporated. The main body 1 comprises a mounting portion 101 composed of a recess formed in the flat base portion and a flat bottom surface provided in the recess, the mounting portion 101 being configured to receive a camera. In the camera attaching portion 101, a side wall 102 defining the recess forms a rectangular frame. In the four corners of the rectangular frame of the camera attaching portion 101, four rib slots 103 are formed in the side wall 102 to allow a holder or a shield holder to be attached to the attaching portion 101. FIG. 2 shows only one of the four rib slots 103. Furthermore, a connector 104 is provided on the flat top surface of the base of the main body 1. The connector is electrically connected to a camera unit 2, described later, via a flexible cable 203.

The bottom surface and side wall 102 of the camera attaching portion 101 are conductively plated to shield the camera unit 2 electromagnetically.

The camera unit 2 is designed so that a camera IC 201 is mounted on a ceramic substrate 202 together with other chip parts and so that the flexible cable 203 is connected to a terminal on the ceramic substrate 202. A lens 204 is incorporated into the camera IC 201 at its top. Furthermore, a ground pattern is provided in each of the four corners of the ceramic substrate 202. The ground patterns 208 abut against respective ribs 302 of the shield holder 3 when the ceramic substrate 202 is attached to the camera attaching portion 101 using the shield holder 3. The bottom surface of the ceramic substrate 202 is formed to be substantially flat in association with the bottom surface of the camera attaching portion 101. The camera substrate 202 is housed in the camera attaching portion 101 as described later and is arranged so as to create a gap between its periphery and the side wall 102 of the camera attaching portion 101. Preferably, the ceramic substrate 202 is arranged so that its bottom surface is not direct contact with the bottom surface of the camera attaching portion 101, i.e. a gap is created between these bottom surfaces. The gaps are thus created around the periphery and over the bottom surface of the ceramic substrate 202. Accordingly, when the main body 1 is shocked, this shock is prevented from being transmitted directly to the ceramic substrate 202. Consequently, the ceramic substrate 202 is protected from shocks. This structure is provided in the equipment shown in FIG. 2.

Figure 1:
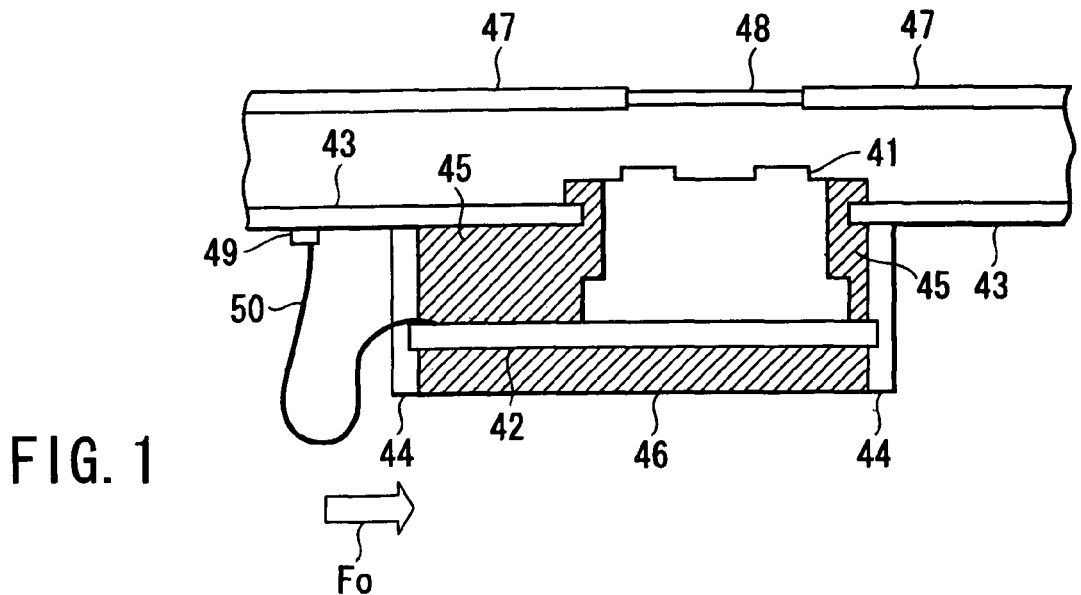
FIG. 1 is a sectional view schematically showing a part of a terminal device to which a conventional camera unit has been attached.
Figure 3:
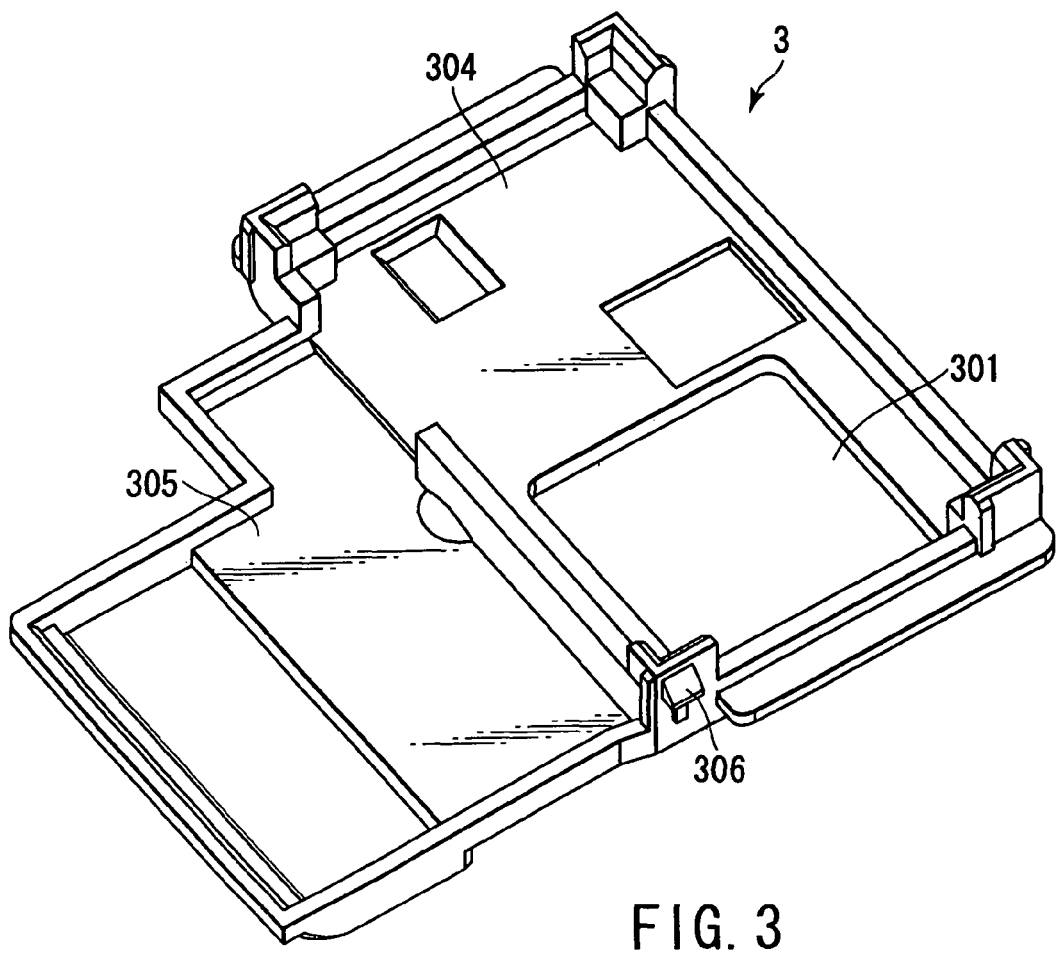
FIG. 3 is a rear perspective view of the shield holder shown in FIG. 2, showing its structure.

The shield holder 3 is shaped to cover the camera unit 2 so as to create a gap between itself and the camera unit 2 as shown in FIG. 2. The shield holder 3 comprises a window portion 301 in which the camera IC 201 is installed and four ribs 302 engaged with the respective rib slots 102 in the camera attaching portion 101. The surfaces of the shield holder 3 and ribs 302 are conductively plated. FIG. 3 shows the rear structure of the shield holder 3. As shown in this figure, the shield holder 3 is composed of a rectangular main cover portion 304 corresponding to the rectangular ceramic substrate 202 and an auxiliary cover portion 306 extended from the main cover portion 304. The main cover portion 304 is formed with the rectangular window portion 301 in which the base of the camera IC 201 is fitted and recesses formed in association with the arrangement of the parts on the ceramic substrate 202 to avoid contact with these parts. A frame of the shield holder 3 is provided in the periphery of the main cover portion 304 and auxiliary cover portion 305 as a rim. Leg-like rims 302 are provided in the four corners of the main cover portion 304. Each of the rims 302 is provided with an engaging portion 306 that engages with the corresponding rib slot 103 as already described. The auxiliary cover portion 305 is formed with a recess that receives the connector. In the thus configured shield holder 3, the main cover portion 304 mainly covers the ceramic substrate 202. Furthermore, the auxiliary cover portion 306 covers the flexible cable 203 and the connector 104.

In the structure shown in FIG. 2, the camera unit 2 is assembled in the equipment using the procedure described below. First, the flexible cable 203 is connected to the connector 104. Then, the camera unit 2 is accommodated in the camera attaching unit 101 in the direction shown in FIG. 2.

Subsequently, the four ribs 302 of the shield holder 3 are fitted in the respective four rib slots 103 to attach the shield holder 3 to the main body 1 to cover the camera unit 2. In this case, a view from the lens 204 is obtained through the window portion 301.

Now, with reference to FIG. 4, description will be given of the point that when the camera unit 2 is accommodated in the camera attaching portion 101, the camera unit 2 can be set in position without aligning the camera unit 2 with the camera attaching portion 101.

Figure 4:
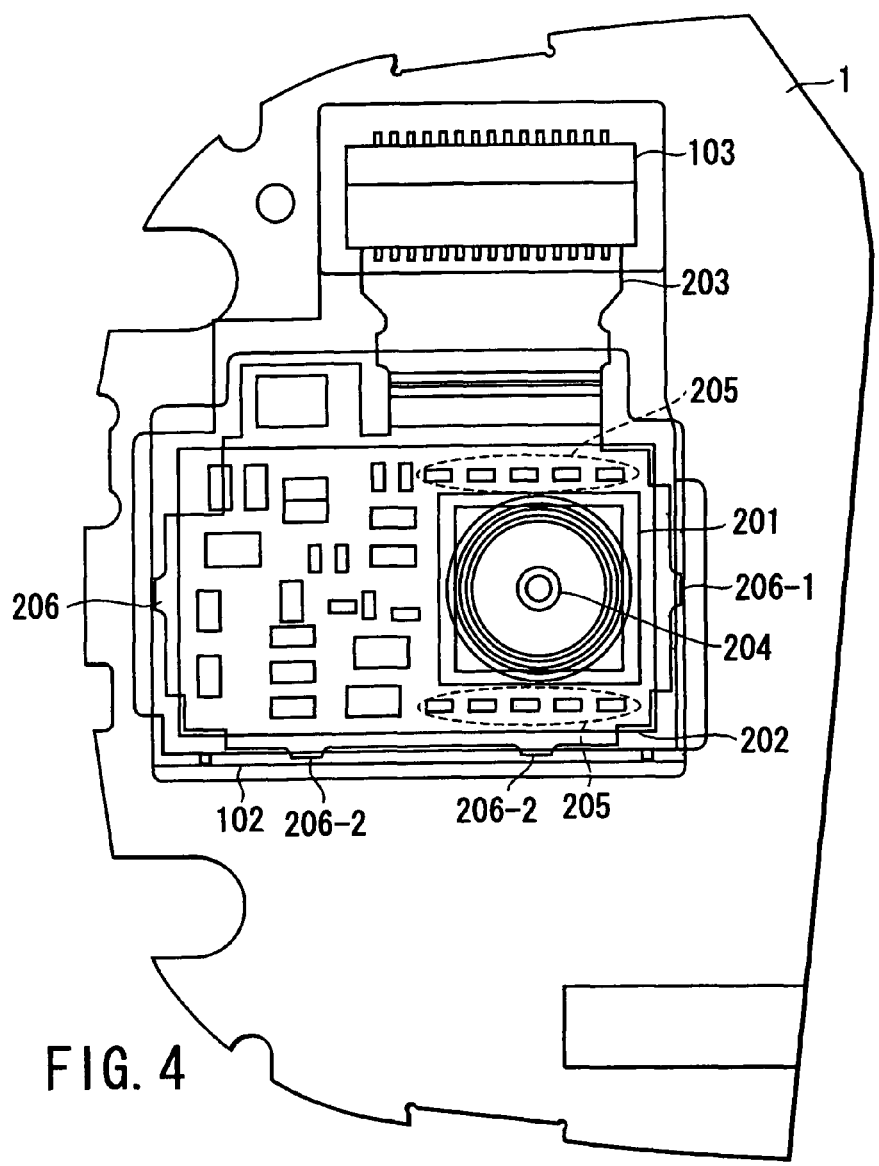
FIG. 4 is a plan view schematically showing the interior of the mobile terminal with the camera shown in FIG. 2.

FIG. 4 is a plan view showing the interior of the equipment, in which the camera unit 1 is attached to the main body 1, as viewed from above. In FIG. 4, reference numeral 205 denotes soldering portions used to connect the conductors of the flexible cable 203 to patterns on the back surface of the ceramic substrate 202. Reference numerals 206-1 and 206-2 denote projections projecting from corresponding sides of the flexible cable 203. Specifically, when flexible cables 203 are cut from one another during their manufacturing process, tongue pieces are left on the lateral sides and terminal side of each flexible cable 203 as the projections 306-1. The flexible cable 203 has a width substantially equal to that of the ceramic substrate 202 in its longitudinal direction. The flexible cable 203 is extended along the bottom surface of the ceramic substrate 202. When the flexible cable 203 is fixed to the ceramic substrate 202, the projections 206-1 and 206-2 project outward from the sides of the ceramic substrate 202. Normally, the conductors of the flexible cable 203 are soldered to the wiring patterns on the ceramic substrate 202 to connect electrically and mechanically the flexible cable 203 and the ceramic substrate 202 together. When the ceramic substrate 202 is housed in the camera attaching portion 101 together with the flexible cable 203, the projections 206 are abutted against the side wall 102 of the camera attaching portion 101 to position the ceramic substrate 2. The camera unit 2 is thus set in position. As a result, the camera unit 2 to be mounted in the camera attaching portion 101 of the main body 1 is positioned in itself in a lateral direction as shown in FIG. 4. Furthermore, in the direction perpendicular to the camera unit 2, the flexibility of the flexible cable 203 causes a force that urges the ceramic substrate 202 upward. Moreover, when the shield holder 3 is installed in the camera attaching portion 101, it exerts a force that pushes the camera unit 2 downward. Thus, the camera unit 2 is also positioned in the vertical direction. This allows the camera unit to be accurately attached to the main body 1.

Figure 5:
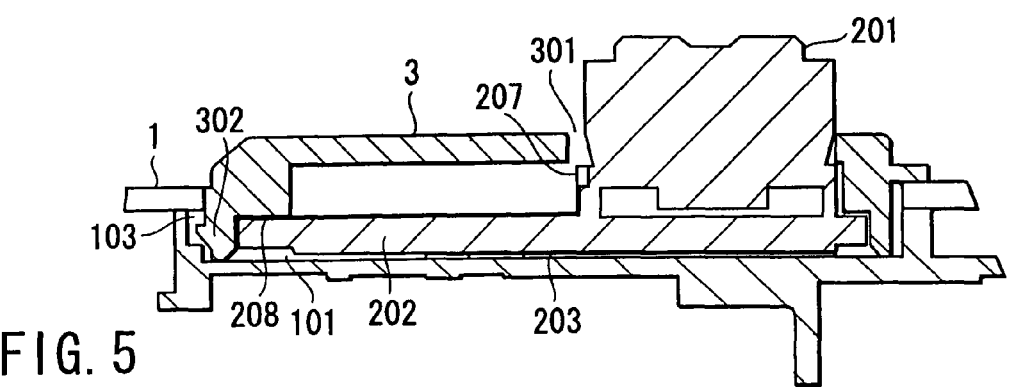
FIG. 5 is a sectional view schematically showing the mobile terminal with the camera shown in FIG. 2.

When the shield holder 3 is attached to the main body 1, the surface of the shield holder 3, plated with conductors, has a potential equal to the ground potential of the camera IC 201. Consequently, the ceramic substrate 202 of the camera unit 2 is electromagnetically shielded by these conductors. FIG. 5 is a sectional view showing that the camera unit 2 and the shield cover 3 are attached to the camera attaching portion 101 of the main body 1. In FIG. 5, reference numeral 207 denotes a ground terminal of the camera IC 201 connected to the ground pattern 208 provided in an area that abuts against the corresponding rib 302 on the ceramic substrate 202. The ground patterns 208 are connected to a common ground terminal such as another chip IC on the ceramic substrate 202. As shown in FIG. 5, the flexible cable 203 is arranged in the space between the bottom surface of the camera attaching portion 101 and the bottom surface of the ceramic substrate 202. As already described, the resilience of the flexible cable 203 causes a force that urges the ceramic substrate 202 upward.

As shown in FIG. 5, the ribs 302 of the shield holder 3 are fitted in the respective rib slots 103 to attach the shield holder 3 to the camera attaching portion 101. The shield holder 3 is thus mounted so as to press, from above, the ceramic substrate 202 sitting on the resilient flexible cable 203. Accordingly, the ground patterns 208 have their surfaces pressed against the respective conductive ribs 302 to energize both themselves and the ribs 302. The conductive surface of the shield holder 3 is kept at the same potential as that of the ground terminal 207 of the camera IC 201. Therefore, with the shield holder 3, the ceramic substrate 202 is electromagnetically shielded by the conductors on the shield holder 3.

In FIG. 5, as described above, the resilient flexible cable 203 is sandwiched between the bottom surface of the camera attaching portion 101 and the ceramic substrate 202 to act as a shock absorbing member. This shock absorbing effect can be further improved by mounting the flexible cable 203 in such a manner that the cable 203 is folded at the position where it is sandwiched.

In the present embodiment, the bottom surface and side wall 102 of the camera attaching portion 101 are plated with a conductive material in order to produce an electromagnetic shield effect on the camera unit 2. On the other hand, the projections 206 of the flexible cable abut against the side wall 102. Furthermore, the flexible cable 203 is sandwiched between the bottom surface of the camera attaching portion 101 and the ceramic substrate 202. This prevents the conductive patterns on the ceramic substrate 202 from coming into contact with the bottom surface and side wall 102 of the camera attaching portion 101.

As described above, according to the embodiment of the present invention, when the camera unit 2 is accommodated in the camera attaching portion 101, it is unnecessary to carry out alignment for the prevention of misalignment of the optical axis or the like. In this case, it is also unnecessary to provide a special shape or structure or attach special members. Moreover, the camera unit 2 using the ceramic substrate 202 can appropriately resist shocks, and the shield holder 3 can realize an electromagnetic shield characteristic.

The above described embodiment of the present invention can be achieved using a simple holder having no electromagnetic shield characteristics in place of the shield holder 3. The simple holder differs from the shield holder 3 only in the absence of an electromagnetic shield characteristic. Furthermore, the camera incorporating method according to the present invention requires no special shock absorbing members or holding members, thus enabling the size of the equipment to be reduced. Therefore, this method can be applied to mobile electronic equipment such as a mobile phone terminal to implement mobile electronic equipment with a camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A mobile electronic equipment, comprising:
a main body, having a flat bottom surface and a flat side which cooperatively form a frame, and having a recess;
a camera unit including a substrate, a flexible cable which is connected to the substrate and is extended between the substrate and the flat bottom surface, and a camera IC portion mounted on the substrate, the camera IC portion having a ground terminal and the substrate having patterns, and at least one of the patterns being connected to the ground terminal; and a holder having a window portion and a cover portion which covers the camera unit, the camera unit being housed in the recess together with the holder in which the camera IC portion is passed through the window portion, and the camera unit being incorporated into the main body and fixed on the main body by the holder, wherein the cover portion has inner surface on which a conductive layer is formed, and the flexible cable applies an abutting force to the substrate so that a part of the conductive layer is abutted against the corresponding pattern on the substrate to connect electrically the holder to the ground terminal of the camera IC.

2. The mobile electronic equipment with the camera according to claim 1, wherein each side portion of the camera unit is provided with a plurality of projections which abut against a side wall of the recess, and when the camera unit is accommodated in the recess, the projections abut against the side wall to set the camera unit in position.

3. The mobile electronic equipment with the camera according to claim 1, wherein the main body is provided with a connector, and a flexible cable connects the connector to the substrate, and at least a part of the flexible cable is arranged between the substrate and a bottom surface of the recess in the main body.

4. The mobile electronic equipment with the camera according to claim 3, wherein at least a part of the flexible cable is folded between the substrate and the bottom surface of the recess in the main body.

5. The mobile electronic equipment with the camera according to claim 1, wherein the flat bottom surface of the main body and the side of the main body which is perpendicular to the bottom surface are conductive,
   each side portion of the camera unit is provided with a plurality of projections which abut against the side, and when the camera unit is accommodated in the recess in the main body, the projections abut against the side to set the camera unit in position,
   at least a part of the flexible cable is arranged between the substrate and the bottom surface of the recess in the main body, and
   gaps are created between the camera unit and both the bottom surface and the side.

6. A mobile electronic equipment, comprising:
   a main body defining a recess having a flat bottom surface and flat side walls;
   a connector provided on the main body;
   a camera unit including a substrate and a camera IC portion mounted on the substrate and the camera IC having a ground terminal, the substrate having patterns connected to the ground terminal;
   a holder having a window portion and a cover portion which covers the camera unit, the camera unit being housed in the recess together with the holder in which the camera IC portion is passed through the window portion, and the camera unit being incorporated into the main body and fixed on the main body by the holder; and
   a flexible cable connected to the substrate, at least a part of the flexible cable being arranged between the substrate and a bottom surface of the recess in the main body, the flexible cable defining projections projecting from sides of the flexible cable, the projections abutting against the flat side walls of the recess to position the substrate in the recess and prevent conductive patterns on the substrate from coming into contact with conductive plating on the flat bottom surface and flat side walls of the recess.

7. A mobile electronic equipment, comprising:
   a main body defining a recess having a flat bottom surface and flat side walls;
   a connector provided on the main body;
   a camera unit including a substrate, and a camera IC portion mounted on the substrate and the camera IC having a ground terminal, the substrate having patterns connected to the ground terminal;
   a holder having a window portion and a cover portion which covers the camera unit, the camera unit being housed in the recess together with the holder in which the camera IC portion is passed through the window portion, and the camera unit being incorporated into the main body and fixed on the main body by the holder; and
   a flexible cable connected to the substrate, at least a part of the flexible cable being folded between the substrate and the bottom surface of the recess in the main body, the flexible cable defining projections projecting from sides of the flexible cable, the projections abutting against the flat side walls of the recess to position the camera unit without actively aligning the camera unit with the recess and to prevent conductive patterns on the substrate from coming into contact with conductive plating on the flat bottom surface and flat side walls of the recess.

8. A mobile electronic equipment, comprising:
   a main body defining a recess having a conductive flat bottom surface and conductive flat side walls perpendicular to the conductive flat bottom surface;
   a connector provided on the main body;
   a camera unit including a substrate and a camera IC portion mounted on the substrate and the camera IC having a ground terminal, the substrate having patterns connected to the ground terminal;
   a holder having a window portion and a cover portion which covers the camera unit, the camera unit being housed in the recess together with the holder in which the camera IC portion is passed through the window portion, and the camera unit being incorporated into the main body and fixed on the main body by the holder; and
   a flexible cable connected to the substrate, at least a part of the flexible cable arranged between the substrate and the bottom surface of the recess in the main body, the flexible cable defining projections projecting from sides of the flexible cable, the projections abutting against the conductive flat side walls of the recess to set the camera unit in position in the recess and to prevent conductive patterns on the substrate from coming into contact with the conductive flat bottom surface and conductive flat side walls of the recess.

9. A mobile electronic equipment, comprising:
   a main body having a bottom surface and side walls which cooperatively form a frame;
   a camera unit including a substrate, and a camera IC portion mounted on the substrate, which is received in the frame; and
   a flexible cable connected to the substrate, at least a part of the flexible cable being folded between the substrate and the bottom surface in the main body, the flexible cable defining projections projecting from sides of the flexible cable, the projections abutting against the side walls of the frame to set the camera unit in position in the frame and prevent conductive patterns on the substrate from coming into contact with conductive plating on the bottom surface and side walls of the frame.

* * * * *